US010736043B2

(12) United States Patent
Lee et al.

(10) Patent No.: US 10,736,043 B2
(45) Date of Patent: Aug. 4, 2020

(54) SURVEILLANCE SYSTEM AND METHOD OF CONTROLLING THE SAME (71) Applicant: HANWHA TECHWIN CO., LTD., Seongnam-si (KR)

(72) Inventors: Joon Sung Lee, Changwon-si (KR); Min Suk Sung, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 338 days.

(21) Appl. No.: 15/761,358

(22) PCT Filed: Apr. 5, 2016

(86) PCT No.: PCT/KR2016/003493
§ 371 (c)(1),
(2) Date: Mar. 19, 2018

(87) PCT Pub. No.: WO2017/122873
PCT Pub. Date: Jul. 20, 2017

(65) Prior Publication Data
US 2018/0270763 A1 Sep. 20, 2018

(30) Foreign Application Priority Data
Jan. 11, 2016 (KR) .................. 10-2016-0003328

(51) Int. Cl.
H04W 52/02 (2009.01)
H04N 7/18 (2006.01)
(Continued)

(52) U.S. Cl.
CPC ........ *H04W 52/0277* (2013.01); *G08B 21/24* (2013.01); *G08B 25/08* (2013.01);
(Continued)

(58) Field of Classification Search
CPC ..... H04N 7/18; H04N 7/181; H04W 52/0251; H04W 52/0277; G08B 21/24;
(Continued)

(56) References Cited

U.S. PATENT DOCUMENTS 7,508,168 B2     3/2009  Nunomaki et al.
2008/0268917 A1  10/2008 Chang et al.
(Continued)

FOREIGN PATENT DOCUMENTS

KR  10-2004-0048493 A   6/2004
KR  10-2007-0050276 A   5/2007
(Continued)

OTHER PUBLICATIONS

International Search Report, issued by International Searching Authority in corresponding International Application No. PCT/KR2016/003493, dated Oct. 4, 2016, (PCT/ISA/210).
(Continued)

*Primary Examiner* — Mischita L Henson
(74) *Attorney, Agent, or Firm* — Sughrue Mion, PLLC (57) ABSTRACT A surveillance system includes: a communication module receiving battery information from a plurality of network cameras; and a processor calculating a plurality of remaining battery lives based on the battery information, wherein if a remaining battery life obtained from first battery information received from a first network camera is equal to or shorter than a preset reference remaining life, the processor selects a second network camera from among the plurality of network cameras so as to exchange a battery of the second network camera with a battery of the first network camera.

15 Claims, 7 Drawing Sheets (51) Int. Cl.
 *G08B 21/24* (2006.01)
 *G08B 25/08* (2006.01)
(52) U.S. Cl.
 CPC .............. *H04N 7/18* (2013.01); *H04N 7/181* (2013.01); *H04W 52/0251* (2013.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/166* (2018.01)
(58) Field of Classification Search
 CPC .. G08B 25/08; Y02D 70/162; Y02D 70/1262; Y02D 70/166; Y02D 70/142; Y02D 70/144; Y02D 70/146
 See application file for complete search history.

(56) References Cited

U.S. PATENT DOCUMENTS

| | | |
|---|---|---|
| 2010/0145643 A1 | 6/2010 | Katpelly et al. |
| 2013/0148283 A1 | 6/2013 | Forutanpour et al. |
| 2014/0003311 A1 | 1/2014 | Chin et al. |
| 2014/0107466 A1 | 4/2014 | Song et al. |
| 2015/0338469 A1 | 11/2015 | Lee et al. |
| 2017/0063560 A1* | 3/2017 | Chen .................... H04M 11/062 |
| 2017/0170677 A1 | 6/2017 | Park et al. |

FOREIGN PATENT DOCUMENTS

| | | |
|---|---|---|
| KR | 10-0982096 B1 | 9/2010 |
| KR | 10-2010-0114748 A | 10/2010 |
| KR | 10-1499557 B1 | 3/2015 |
| KR | 10-2017-0071267 A | 6/2017 |

OTHER PUBLICATIONS

PCT/ISA/220, issued by International Searching Authority in corresponding International Application No. PCT/KR2016/003493, dated Oct. 4, 2016.

Written Opinion, issued by International Searching Authority in corresponding International Application No. PCT/KR2016/003493, dated Oct. 4, 2016, (PCT/ISA/237).

* cited by examiner

| IDENTIFIER | INSTALLATION PLACE | INSTALLATION PERIOD | AVERAGE POWER CONSUMPTION RATE | REMAINING LIFE | BATTERY EXCHANGE TARGET | REMAINING LIFE AFTER BATTERY EXCHANGE (CHANGED LIFE) |
|---|---|---|---|---|---|---|
| CAMa | LIVING ROOM | 5 MONTHS | 190 mA/s | 1 MONTHS | CAMa ↔ CAMf | 3 MONTHS (+2 MONTHS) |
| CAMb | MAIN ROOM | 5 MONTHS | 90 mA/s | 4 MONTHS | | |
| CAMc | FRONT DOOR | 4 MONTHS | 170 mA/s | 3 MONTHS | | |
| CAMd | SMALL ROOM 1 | 3 MONTHS | 120 mA/s | 5 MONTHS | | |
| CAMe | VERANDA | 2 MONTHS | 100 mA/s | 8 MONTHS | | |
| CAMf | STORAGE | 5 MONTHS | 50 mA/s | 12 MONTHS | CAMf ↔ CAMa | 6 MONTHS (−6 MONTHS) |

| IDENTIFIER | INSTALLATION PLACE | REMAINING LIFE | RECENT EVENT DETECTION TIME | BATTERY EXCHANGE TARGET | REMAINING LIFE AFTER BATTERY EXCHANGE (CHANGED LIFE) |
|---|---|---|---|---|---|
| CAMa | LIVING ROOM | 0 MONTH | 14:00, DEC 1ST | CAMa ↔ CAMe | 2 MONTHS (+2 MONTHS) |
| CAMb | MAIN ROOM | 3 MONTHS | 19:00, OCT 1ST | | |
| CAMc | FRONT DOOR | 2 MONTHS | 15:00, NOV 1ST | | |
| CAMd | SMALL ROOM 1 | 4 MONTHS | 12:00, MAY 1ST | | |
| CAMe | VERANDA | 7 MONTHS | 07:00, FEB 1ST | CAMe ↔ CAMa | 0 MONTH (−7 MONTHS) |
| CAMf | STORAGE | 11 MONTHS | 13:00, JUN 1ST | | |

SURVEILLANCE SYSTEM AND METHOD OF CONTROLLING THE SAME

TECHNICAL FIELD

One or more embodiments relate to a surveillance system and a method of controlling the surveillance system.

BACKGROUND ART

Recently, many cameras are installed on the insides or outsides of buildings or streets for various purposes such as crime prevention, security, or store management. Such cameras may be connected to each other through a wired or wireless network and may function as network cameras.

In addition, a manager may access cameras installed in a management zone through a device such as a personal computer (PC) so as to perform remote management on buildings or stores.

The inventors had or learned problems of the related art when or while inventing the present invention, and the problems of the related art may not be publicly known before the filing of the present patent application.

Technical Problem

One or more embodiments include a surveillance system configured to hand discharged batteries and a method of controlling the surveillance system.

Additional aspects will be set forth in part in the description which follows and, in part, will be apparent from the description, or may be learned by practice of the presented embodiments.

Technical Solution

According to one or more embodiments, a surveillance system includes: a communication module receiving battery information from a plurality of network cameras; and a processor calculating a plurality of remaining battery lives based on the battery information, wherein if a remaining battery life obtained from first battery information received from a first network camera is equal to or shorter than a preset reference remaining life, the processor selects a second network camera from among the plurality of network cameras so as to exchange a battery of the second network camera with a battery of the first network camera.

The second network camera may have a longest remaining battery life among the plurality of network cameras.

The surveillance system may further include a memory storing a network camera identifier and an installation period of each of the plurality of network cameras, wherein the processor may extract a network camera identifier and a remaining battery charge level of each of the plurality of network cameras from the battery information, may calculate an average power consumption rate of the each of plurality of network cameras using the installation period and the remaining battery charge level based on the network camera identifier, and may calculate the remaining battery life of each of the plurality of network cameras using the remaining battery charge level and the average power consumption rate of each of the plurality of network cameras.

The communication module may receive event information from the plurality of network cameras, and the processor may extract a recent event detection time of each of the plurality of network cameras from the event information and may select a network camera whose recent event detection time is oldest as the second network camera.

The communication module may receive event information from the plurality of network cameras, and the processor may extract an event detection frequency of each of the plurality of network cameras based on the event information and may select a network camera whose event detection frequency is lowest as the second network camera.

The surveillance system may further include a network interface transmitting a battery-exchange alarm to a monitor terminal through a network, so as to request exchanging of the battery of the first network camera with the battery of the second network camera.

The battery-exchange alarm may include at least one of a first network camera identifier, a first remaining battery life, a second network camera identifier, a second remaining battery life obtained from second battery information received from the second network camera, and remaining battery lives that the first and second network cameras will have after the batteries of the first and second network cameras are exchanged.

The surveillance system may further include a user interface receiving a user's input for setting the reference remaining life.

According to one or more embodiments, a method of controlling a surveillance system includes: determining a reference remaining life; receiving battery information from a plurality of network cameras; calculating a plurality of remaining battery lives based on the battery information; respectively comparing the plurality of remaining battery lives with the reference remaining life; and if a first network camera having a first remaining battery life equal to or shorter than the reference remaining life is detected, selecting a second network camera from among the plurality of network cameras so as to exchange a battery of the second network camera with a battery of the first network camera.

The selecting of the second network camera may include selecting a network camera whose remaining battery life is longest among the plurality of network cameras as the second network camera.

Prior to the receiving of the battery information, the method may further include storing a network camera identifier and an installation period of each of the plurality of network cameras, wherein the calculating of the plurality of remaining battery lives may include: extracting a network camera identifier and a remaining battery charge level of each of the plurality of network cameras from the battery information; calculating an average power consumption rate of each of the plurality of network cameras using the installation period and the remaining battery charge level based on the network camera identifier; and calculating the plurality of remaining battery lives corresponding to the plurality of network cameras using the remaining battery charge level and the average power consumption rate of each of the plurality of network cameras.

Prior to the selecting of the second network camera, the method may further include receiving event information from the plurality of network cameras, wherein the selecting of the second network camera may include: extracting a recent event detection time of each of the plurality of network cameras from the event information; and selecting a network camera whose recent event detection time is oldest as the second network camera.

Prior to the selecting of the second network camera, the method may further include receiving event information from the plurality of network cameras, wherein the selecting of the second network camera may include: extracting an event detection frequency of each of the plurality of network cameras based on the event information; and selecting a network camera whose event detection frequency is lowest as the second network camera.

After the selecting of the second network camera, the method may further include: generating a battery-exchange alarm to request exchanging of the batteries of the first and second network cameras; and transmitting the battery-exchange alarm to a monitor terminal through a network.

The battery-exchange alarm may include at least one of a first network camera identifier, a second network camera identifier, and remaining battery lives that the first and second network cameras will have after the batteries of the first and second network cameras are exchanged.

Advantageous Effects

According to the one or more of the above embodiments, discharged batteries may be managed without incurring additional costs by exchanging batteries of network cameras according to the remaining charge levels of the batteries.

In addition, according to the one or more of the embodiments, a network camera which has not recently detected events or does not frequently detect events may be selected as a battery exchange target, and thus the possibility that the surveillance system 10 fails to detect events may be decreased.

That is, the surveillance system 10 may detect events more efficiently with low costs.

DESCRIPTION OF DRAWINGS

These and/or other aspects will become apparent and more readily appreciated from the following description of the embodiments, taken in conjunction with the accompanying drawings in which.

MODE FOR INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed. Expressions such as "at least one of," when preceding a list of elements, modify the entire list of elements and do not modify the individual elements of the list. Moreover, detailed descriptions related to well-known functions or configurations will be ruled out in order not to unnecessarily obscure subject matters of the present disclosure.

It will be understood that although the terms "first" and "second" are used herein to describe various elements, these elements should not be limited by these terms. Terms are only used to distinguish one element from other elements.

In the following description, the technical terms are used only for explaining a specific embodiment while not limiting the inventive concept. The terms of a singular form may include plural forms unless referred to the contrary. The meaning of "include" or "comprise" specifies a property, a fixed number, a step, a process, an element, a component, and a combination thereof but does not exclude other properties, fixed numbers, steps, processes, elements, components, and combinations thereof.

The inventive concept of the present disclosure may be embodied as functional blocks and various processing operations. The functional blocks may be implemented with various hardware and/or software configurations executing specific functions. For example, embodiments of the present disclosure may employ integrated circuit configurations such as a memory, processing, logic, a look-up table and the like capable of executing various functions upon control of microprocessors or other control devices. In a similar manner to that in which the elements of the embodiments may be executed with software programming or software elements, the embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

Hereinafter, the embodiments will be described in detail with reference to the accompanying drawings. In the drawings, like reference numerals denote like elements, and overlapping descriptions thereof will be omitted.

Figure 1:
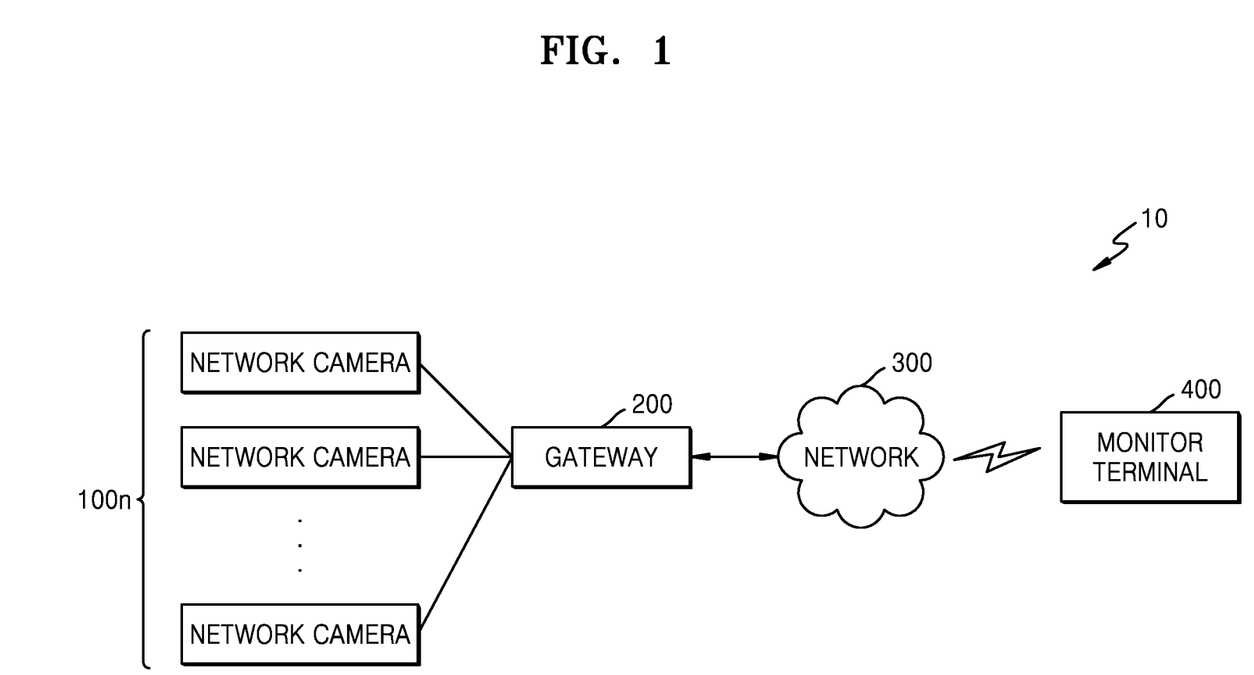
FIG. 1 is a view illustrating a surveillance system according to an embodiment.

FIG. 1 is a view illustrating a surveillance system 10 according to an embodiment.

Referring to FIG. 1, the surveillance system 10 includes network cameras 100n, a gateway 200, a network 300, and a monitor terminal 400.

The surveillance system 10 is configured such that if data of the network cameras 100n collected using the gateway 200 is transmitted to a server (not shown) through the network 300, a manager may monitor the data transmitted to the server by using the monitor terminal 400.

The network cameras 100n may take images of a surveillance zone, respectively. The network cameras 100n may take images of the surveillance zone in real time for surveillance or security, respectively. The network cameras 100n may be pan-tilt-zoom (PTZ) cameras having panning, tilting, zooming functions, respectively.

The network cameras 100n include at least one network camera 100.

According to an embodiment, the network cameras 100n may be low power cameras powered by batteries. The low power cameras normally stay in sleep mode and periodically wake up to check the occurrence of events. If events occur, the low power cameras switch to an active mode, and if events do not occur, the low power cameras switch back to the sleep mode. As described above, since the low power cameras are operated in the active mode only when events occur, the low power cameras consume low power.

The network cameras 100n may communicate with the gateway 200 using a communication scheme such as local area network (LAN), Wi-Fi, ZigBee, Bluetooth, or near field communication. For example, the network cameras 100n may communicate with the gateway 200 according to low power wireless communication protocols using radio frequencies in an industrial scientific medical (ISM) band.

The gateway 200 may recognize states of the network cameras 100n based on data transmitted from the network cameras 100n and may transmit an alarm to the monitor terminal 400 according to the recognized states of the network cameras 100n. For example, the gateway 200 may recognize battery states of the network cameras 100n based on data transmitted from the network cameras 100n and may transmit a battery-exchange alarm to the monitor terminal 400 according to the recognized battery states of the network cameras 100n.

The gateway 200 may transmit information to the server (not shown) and receive commands from the server by a wired or wireless communication scheme such as Ethernet, Wi-Fi, or Bluetooth.

The network 300 may include a wired network or a wireless network. The wireless network may include a 2nd generation (2G) or 3G cellular communication system, a 3rd generation partnership project (3GPP) system, a 4G communication system, a long-term evolution (LTE) system, or a world interoperability for microwave access (WiMAX) system.

The monitor terminal 400 may display or store information transmitted from the server (not shown). For example, the monitor terminal 400 may display a battery-exchange alarm transmitted from the server. The monitor terminal 400 may include at least one processor. The monitor terminal 400 may be operated within another hardware device such as a micro processor or a general-use computer system. The monitor terminal 400 may be a personal computer (PC) or a mobile terminal.

Figure 2:
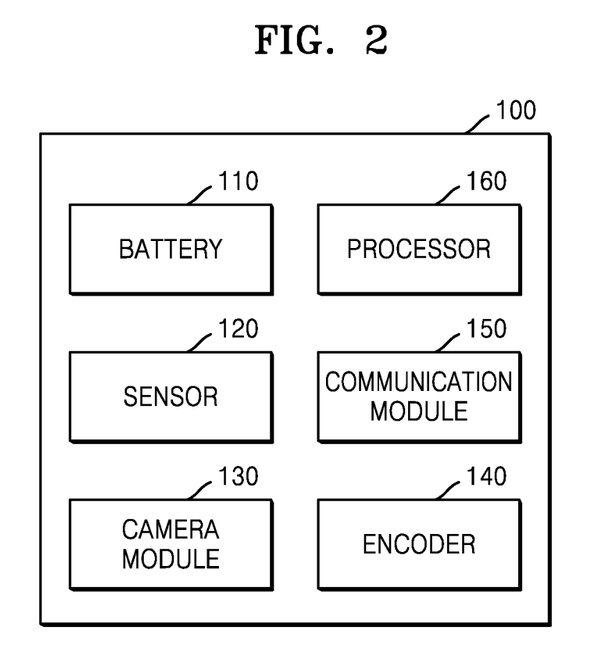
FIG. 2 is a block diagram illustrating a network camera of the surveillance system according to an embodiment.

FIG. 2 is a block diagram illustrating a network camera 100 of the surveillance system 10 according to an embodiment.

Referring to FIG. 2, each of the network cameras 100n of the surveillance system 10 may include a battery 110, a sensor 120, a camera module 130, an encoder 140, a communication module 150, and a processor 160.

The battery 110 supplies power to the network camera 100. For example, when the network camera 100 operates in sleep mode, the battery 110 may supply power to at least one of the sensor 120 and the processor 160. When the network camera 100 operates in active mode, the battery 110 may supply power to the sensor 120, the camera module 130, the encoder 140, the communication module 150, and the processor 160.

The sensor 120 detects event. The sensor 120 may include an infrared sensor, an audio sensor, a motion sensor, a gas sensor, a leakage sensor, a temperature sensor, a humidity sensor, an acceleration sensor, a gyro sensor, a tactile sensor, a pressure sensor, or a vibration sensor.

The camera module 130 photographs a surveillance zone. The camera module 130 may include an image sensor such as a charge coupled device (CCD) sensor or a complementary metal-oxide-semiconductor (CMOS) sensor. The camera module 130 may change a surveillance zone or magnify a target object through panning, tilting, or zooming motion. For example, if the sensor 120 detects an event, the camera module 130 may change its surveillance zone to a zone in which the event is detected or may magnify a target object.

The encoder 140 generates digital signals by encoding images captured using the camera module 130.

The communication module 150 transmits at least one of battery information and event information. The battery information may include a network camera identifier and a remaining battery charge level. The event information may include a network camera identifier, an event type, an event detection time, and event duration. The communication module 150 may communicate with other devices by at least one of local area network (LAN), Wi-Fi, ZigBee, Bluetooth, and near field communication.

The processor 160 controls overall operations of the network camera 100. The processor 160 may periodically or non-periodically extract information about the remaining battery charge level of the battery 110 and may generate battery information including a network camera identifier and the remaining battery charge level.

The processor 160 may periodically extract information about a remaining battery charge level, for example, every month or on the first day of each month. The processor 160 may non-periodically extract information about a remaining battery charge level, for example, each time an event is detected or images are captured. The remaining battery charge level may be inversely proportional to factors such as the event detection frequency of the sensor 120, the photographing frequency of the camera module 130, or the number of panning, titling or zooming motions of the camera module 130.

If the sensor 120 detects an event, the processor 160 may generate event information including a network camera identifier, an event type, an event detection time, and event duration.

Figure 3:
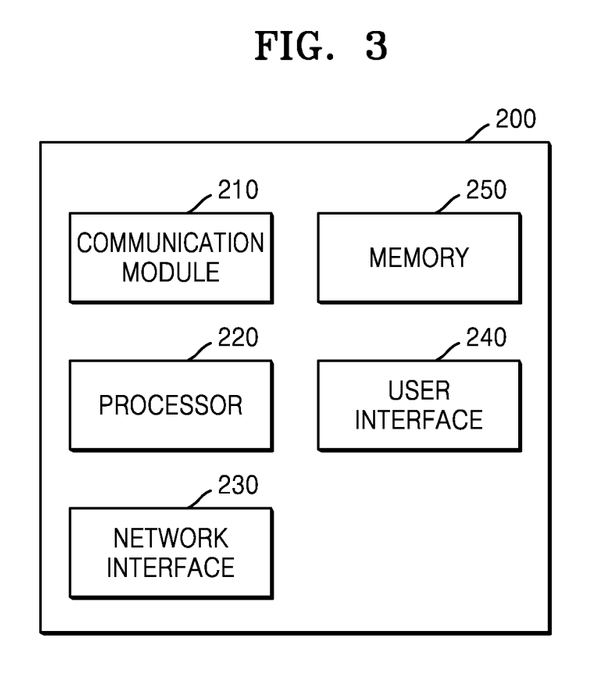
FIG. 3 is a block diagram illustrating a gateway of the surveillance system according to an embodiment.

FIG. 3 is a block diagram illustrating the gateway 200 of the surveillance system 10 according to an embodiment.

Referring to FIG. 3, the gateway 200 includes a communication module 210, a processor 220, a network interface 230, a user interface 240, and a memory 250.

The communication module 210 receives battery information and/or event information from the network cameras 100n. The communication module 210 may communicate with the network camera 100 using at least one of local area network (LAN), Wi-Fi, ZigBee, Bluetooth, and near field communication.

The processor 220 controls overall operations of the gateway 200.

The processor 220 calculates a plurality of remaining battery lives based on the battery information respectively, and if a first remaining battery life extracted from first battery information received from a first network camera is equal to or shorter than a preset reference remaining life, the processor 220 selects a second network camera from among the network cameras 100n so as to exchange the battery of the second network camera with the battery of the first network camera. The first and second network cameras may be included in the network cameras 100n, and the first and second network cameras may not be the same.

The processor 220 may calculate the plurality of remaining battery lives based on the battery information received from the network camera 100. In an embodiment, the processor 220 may extract a network camera identifier and a remaining battery charge level of the network camera 100 from the battery information and may calculate an average power consumption rate of the network camera 100 using an installation period and the remaining battery charge level based on the network camera identifier. Then, the processor 220 may calculate the remaining battery life of the network camera 100 from the remaining battery charge level and the average power consumption rate of the network camera 100.

The term "installation period" may refer to a time period until the present time from the time when a network camera 100 is powered on or registered in the gateway 200.

The average power consumption rate may be calculated based on the installation period, initial battery charge level, and current battery charge level extracted from the battery information. The average power consumption rate may be average current consumption rate, not limited to this.

The remaining battery life may be calculated based on the current battery charge level extracted from the battery information and the average power consumption rate.

In an embodiment, the processor 220 may select battery exchange targets based on the remaining battery life of each of the plurality of network cameras 100n.

The processor 220 may previously set a reference remaining life. The processor 220 may set the reference remaining life according to a user's input. For example, the reference remaining life may be one month.

The processor 220 may compare the remaining battery lives with the preset reference remaining life. According to an embodiment, if the remaining battery lives of all the network cameras 100n are longer than the reference remaining life, discharged batteries may not be handled. That is, battery exchange targets may not be selected. In an embodiment, if a first network camera having a first remaining battery life equal to or shorter than the reference remaining life is included in the network cameras 100n, the processor 220 may select a second network camera from among the network cameras 100n so as to exchange the battery of the first network camera with the battery of the second network camera.

In this case, the first remaining battery life may be the shortest one among the remaining battery lives of the network cameras 100n, and the processor 220 may select a network camera having the longest remaining battery life as the second network camera so as to exchange the battery of the second network camera with the battery of the first network camera. That is, the processor 220 may select the first and second network cameras as the battery exchange targets base on the remaining battery lives of the first and second network cameras. In this manner, a low battery power situation of the first network camera may be handled without incurring additional costs.

In another embodiment, the processor 220 may select battery exchange targets based on event information received from each of the plurality of network cameras 100n.

The processor 220 may extract recent event detection time of each of the network cameras 100n or may calculate event detection frequency of each of the network cameras 100n based on the event information.

In this case, the processor 220 may select a second network camera whose recent event detection time is the oldest or event detection frequency is the lowest from among the network cameras 100n as a battery exchange target for the first network camera. In this way, if a second network camera which has not recently detected event or does not frequently detect events is selected as a battery exchange target, the possibility that the surveillance system 10 fails to detect events may be reduced.

After the processor 220 selects the first and second network cameras as battery exchange targets, the processor 220 may calculate remaining battery lives that the first and second network cameras will have after the batteries of the first and second network cameras are exchanged. For example, the processor 220 may calculate a remaining battery life that the first network camera will have after battery exchange, based on the current remaining battery charge level of the second network camera and the average power consumption rate of the first network camera. In addition, the processor 220 may calculate a remaining battery life that the second network camera will have after battery exchange, based on the current remaining battery charge level of the first network camera and the average power consumption rate of the second network camera.

The processor 220 may generate a battery-exchange alarm to request exchanging of the batteries of the first and second network cameras. According to an embodiment, the battery-exchange alarm may include at least one of a first network camera identifier, a first remaining battery life, a second network camera identifier, a second remaining battery life obtained from second battery information received from the second network camera, and remaining battery lives that the first and second network cameras will have after the batteries of the first and second network cameras are exchanged.

The network interface 230 connects the gateway 200 to the network 300 so that the gateway 200 may connect the network cameras 100n to the monitor terminal 400. The network interface 230 may transmit a battery-exchange alarm to the monitor terminal 400.

The user interface 240 may be used for controlling the gateway 200, registering the network cameras 100n in the gateway 200, releasing the network cameras 100n from the gateway 200, or controlling the network cameras 100n through the gateway 200. For example, the user interface 240 may receive a user's input regarding a reference remaining life. The user interface 240 may include an input module such as a touchscreen, a keypad, or a microphone, and an output module such as a display, a speaker, or an alarm lamp.

The memory 250 may store information about the network cameras 100n. For example, according to network camera identifier, the memory 250 may store information such as an installation place, an installation period, a remaining battery charge level, an average power consumption rate, a remaining battery lives, at least one battery exchange target, or a remaining battery lives after battery exchange. The memory 250 may also store a battery-exchange alarm.

Hereinafter, a method of controlling the surveillance system 10 will be described with reference to FIGS. 4 through 8. In the following description, the network cameras 100n may include network cameras 100a to 100f.

Figure 4:
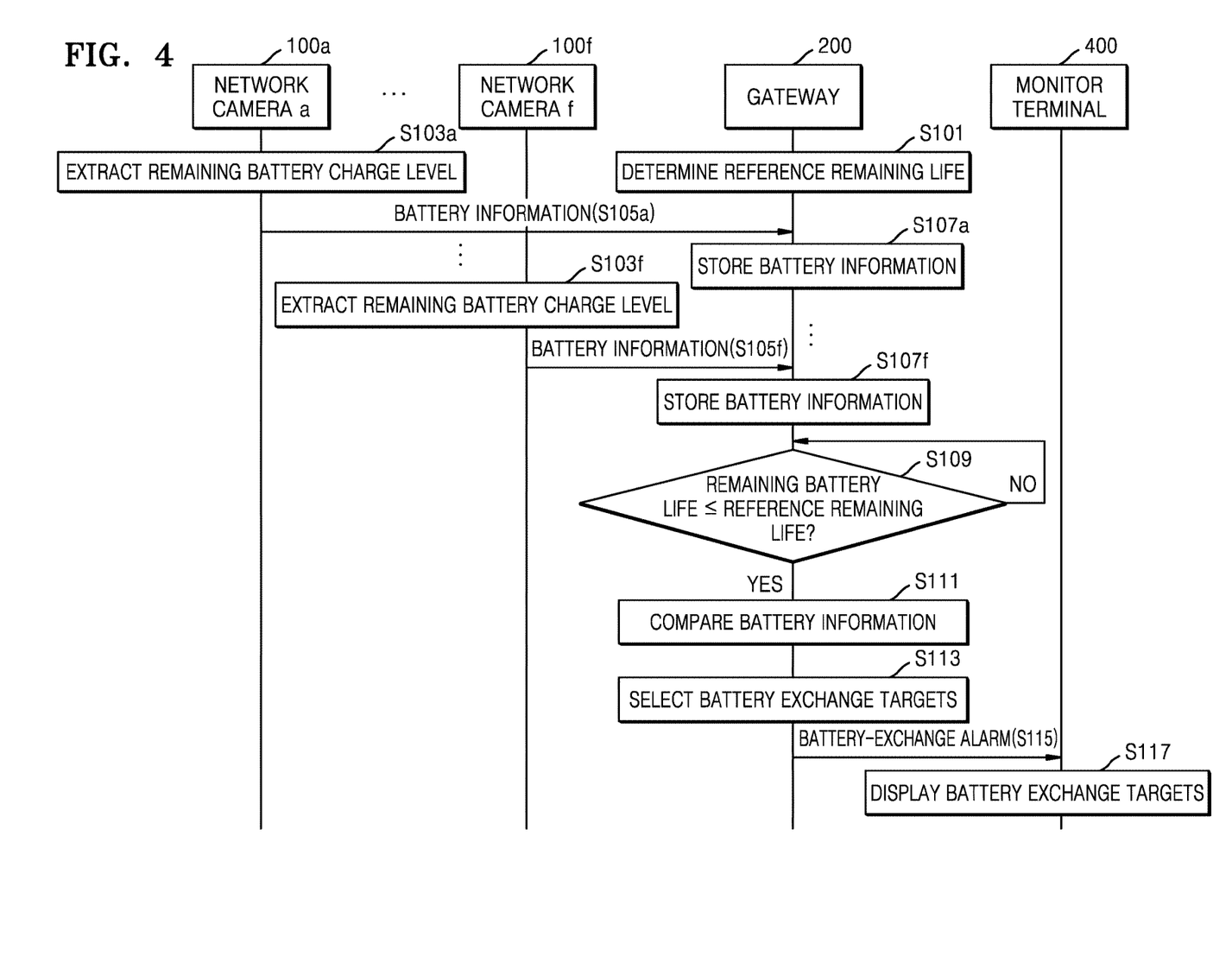
FIG. 4 is a flowchart illustrating a method of controlling the surveillance system according to an embodiment.

FIG. 4 is a flowchart illustrating a method of controlling the surveillance system 10 according to an embodiment.

Referring to FIG. 4, the gateway 200 determines a reference remaining life (S101). For example, the gateway 200 may set the reference remaining life to be one month according to a user's input.

Although not shown in FIG. 4, when the gateway 200 registers the network cameras 100a to 100f, the gateway 200 may store installation places and installation periods of the network cameras 100a to 100f in the memory 250 according to network camera identifiers of the network cameras 100a to 100f.

The network camera 100a extracts its remaining battery charge level (S103a) and transmits battery information containing a network camera identifier CAMa (refer to FIG. 6) and the remaining battery charge level of the network camera 100a to the gateway 200 (S105a).

Next, the gateway 200 stores the battery information received from the network camera 100a (S107a). At this time, the gateway 200 may store the battery information based on the network camera identifier CAMa (refer to FIG. 6).

Although not shown, the same operations as the operations S103a to 107a may be performed in or for the network cameras 100b to 100e (not shown).

In the same manner, the network camera 100f extracts its remaining battery charge level (S103f) and transmits battery information containing a network camera identifier CAMf (refer to FIG. 6) and the remaining battery charge level of the network camera 100f to the gateway 200 (S105f).

Next, the gateway 200 stores the battery information received from the network camera 100f (S107f). At this time, the gateway 200 may store the battery information based on the network camera identifier CAMf (refer to FIG. 6).

Next, the gateway 200 determines whether remaining battery lives of the network cameras 100a to 100f are equal to or shorter than the reference remaining life, respectively (S109). As described above, a first remaining battery life may be a remaining battery life equal to or shorter than the reference remaining life, and a first network camera may be a network camera 100 having the first remaining battery life.

To perform the operation S109, the gateway 200 may first calculate the remaining battery lives of the network cameras 100a to 100f based on the battery information of the network cameras 100a to 100f.

For example, the gateway 200 may extract the installation periods of the network cameras 100a to 100f from the memory 250. The gateway 200 may extract network camera identifiers CAMa to CAMf and remaining battery charge levels of the network cameras 100a to 100f from battery information of the network cameras 100a to 100f. The gateway 200 may calculate average power consumption rates of the network cameras 100a to 100f using the installation periods and the remaining battery charge levels based on the network camera identifiers CAMa to CAMf. Finally, the gateway 200 may calculate the remaining battery lives of the network cameras 100a to 100f based on the remaining battery charge levels and the average power consumption rates of the network cameras 100a to 100f. Then, the remaining battery charge levels, the average power consumption rates, and the remaining battery lives of the network cameras 100a to 100f may be stored in the memory 250 according to the network camera identifiers CAMa to CAMf.

The gateway 200 may compare the calculated remaining battery lives with the reference remaining life, and if a network camera 100 having a remaining battery life equal to or shorter than the reference remaining life is included in the network cameras 100n, the gateway 200 may perform the next operation.

If the gateway 200 detects a first network camera having a first remaining battery life equal to or shorter than the reference remaining life, the gateway 200 compares battery information (S111).

Hereinafter, an operation of comparing battery information and an operation of selecting battery exchange targets in the surveillance system 10 will be described with reference to FIGS. 5 and 6 according to an embodiment.

Figure 5:
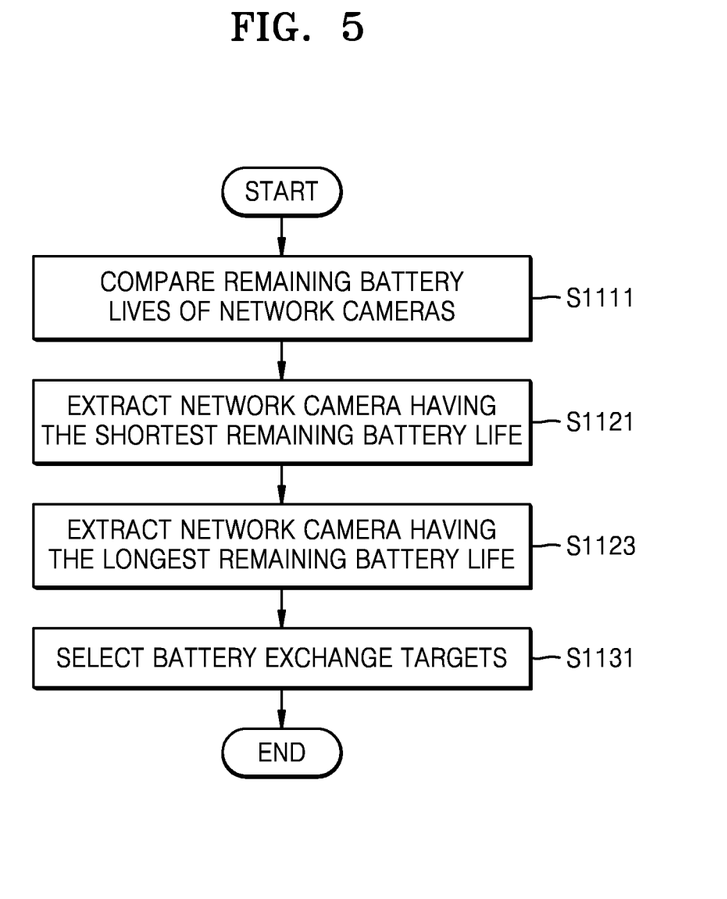
FIG. 5 is a flowchart illustrating an operation of comparing battery information and an operation of selecting battery exchange targets in the surveillance system according to an embodiment.

FIG. 5 is a flowchart illustrating the operation of comparing battery information and the operation of selecting battery exchange targets in the surveillance system 10 according to the embodiment.

Figure 6:
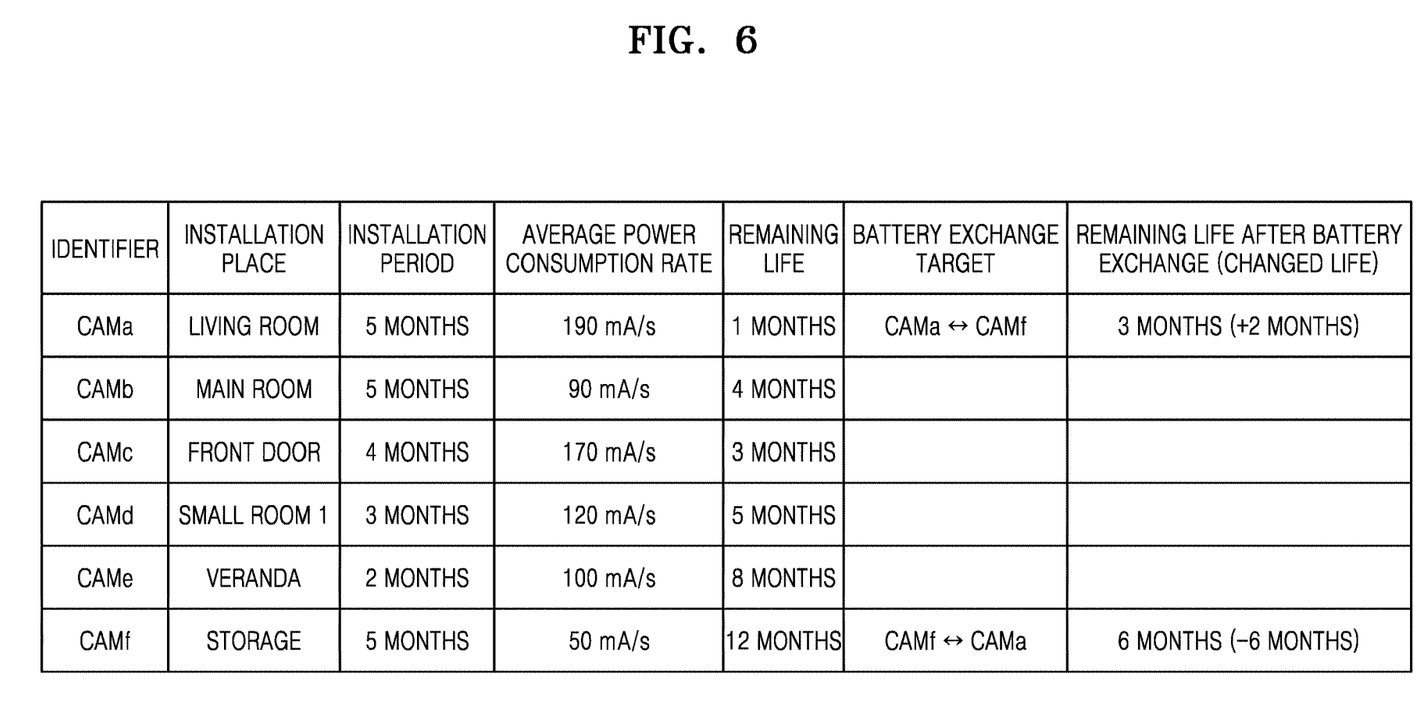
FIG. 6 is a table for illustrating the operation of comparing battery information and the operation of selecting battery exchange targets in the surveillance system according to the embodiment.

FIG. 6 is a table for illustrating the operation of comparing battery information and the operation of selecting battery exchange targets in the surveillance system 10 according to the embodiment.

Referring to FIG. 5, the gateway 200 compares the remaining battery lives of the network cameras 100n (S1111). Referring to FIG. 6, the gateway 200 may compare the remaining battery lives of the network cameras 100a to 100f stored in the memory 250.

Referring back to FIG. 4, the gateway 200 selects a second network camera as a battery exchange target for the first network camera based on results of comparison of battery information (S113).

For example, the gateway 200 may extract a network camera having the shortest remaining battery life (S1121, refer to FIG. 5) and a network camera having the longest remaining battery life (S1123, refer to FIG. 5), and may select the network cameras having the shortest and longest remaining battery lives as battery exchange targets (S1131). In this case, the network camera having the shortest remaining battery life may be the above-described first network camera, and the network camera having the longest remaining battery life may be the above-described second network camera. Referring again to FIG. 6, a network camera CMAa having the shortest remaining battery life (one month) may be selected as the first network camera, and a network camera 100f having the longest remaining battery life (twelve months) may be selected as the second network camera.

Although not shown, after the gateway 200 selects the first and second network cameras as a battery exchange targets, the gateway 200 may calculate remaining battery lives that the first and second network cameras will have after their batteries are exchanged. In addition, the gateway 200 may generate a battery-exchange alarm to request exchanging of the batteries of the first and second network cameras. The battery-exchange alarm may include at least one of a first network camera identifier, a second network camera identifier, and remaining battery lives that the first and second network cameras will have after the batteries of the first and second network cameras are exchanged.

Referring back to FIG. 4, the gateway 200 transmits the battery-exchange alarm to the monitor terminal 400 through the network 300 (S115). The monitor terminal 400 displays the battery-exchange alarm (S117). In this manner, a manager may exchange batteries of network cameras according to a battery-exchange alarm, and thus discharged batteries may be handled without incurring additional costs.

Referring again to FIG. 6, after the gateway 200 selects the network camera 100f as a battery exchange target for the network camera a, the gateway 200 may store remaining battery lives, which the network cameras 100a and 100f will have after the batteries of the network cameras 100a and 100f are exchanged, in the memory 250 according to network camera identifiers CAMa and CAMf of the network cameras 100a and 100f.

Figure 7:
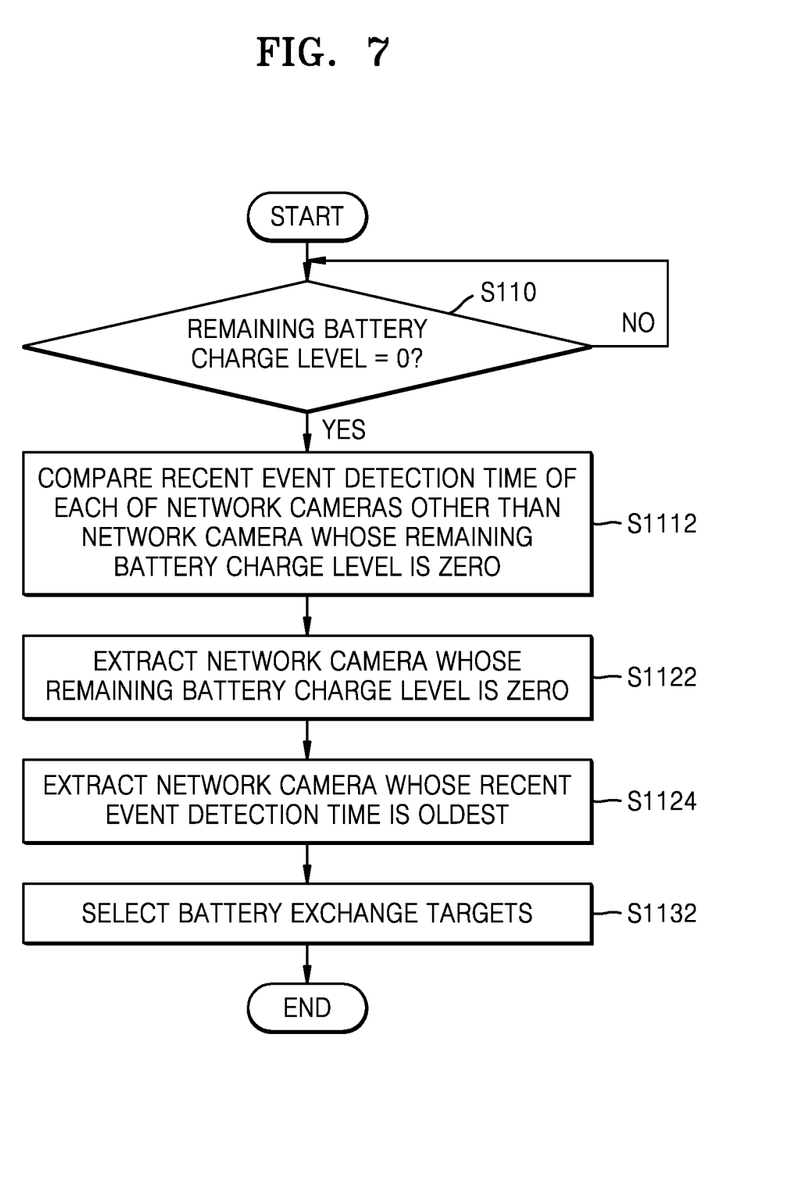
FIG. 7 is a flowchart illustrating an operation of comparing battery information and an operation of selecting battery exchange targets in the surveillance system according to another embodiment.
Figure 8:
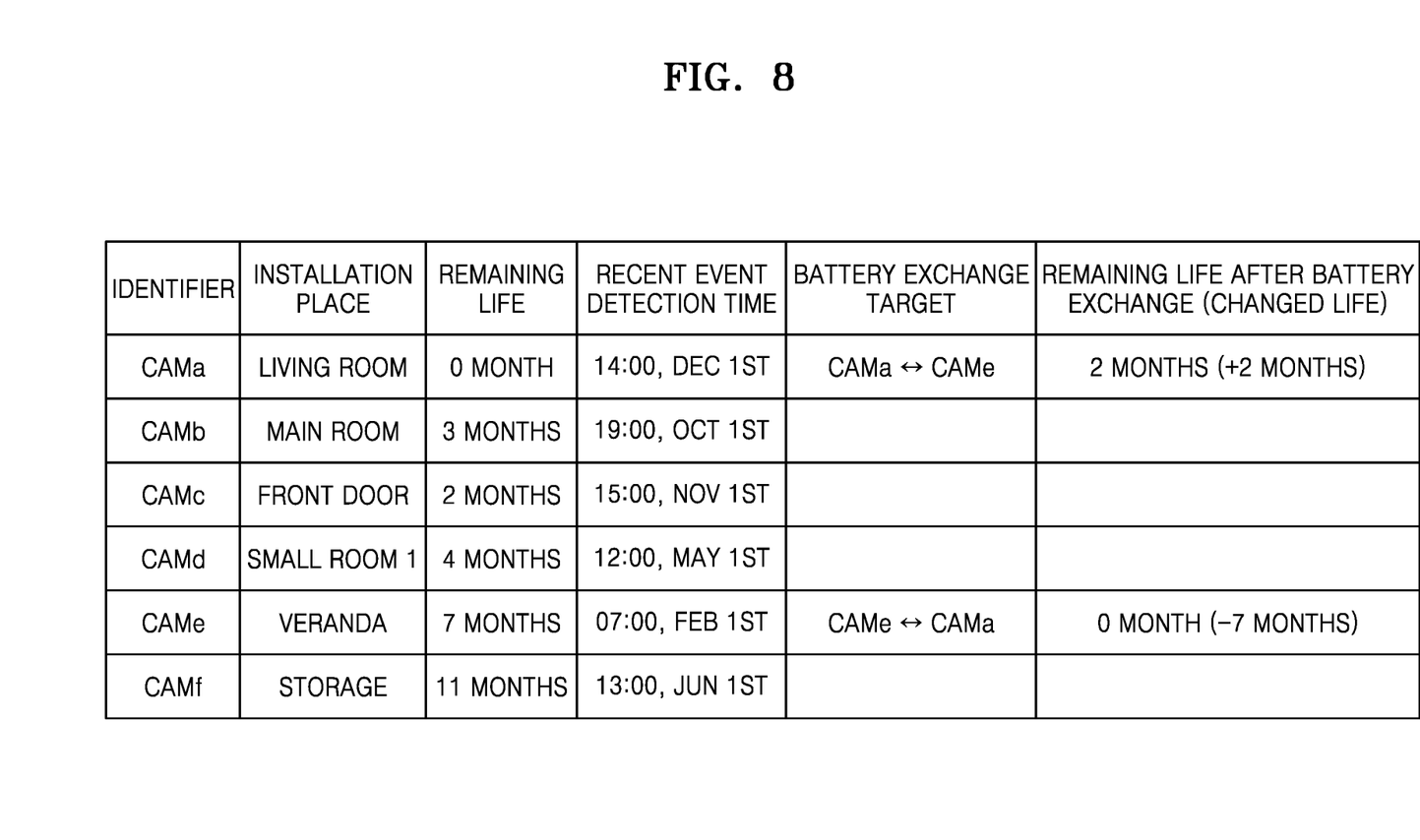
FIG. 8 is a table for illustrating the operation of comparing battery information and the operation of selecting battery exchange targets in the surveillance system according to the other embodiment.

Hereinafter, an operation of comparing battery information and an operation of selecting a battery exchange target in the surveillance system 10 will be described according to another embodiment.

FIG. 7 is a flowchart illustrating the operation of comparing battery information and the operation of selecting battery exchange targets in the surveillance system 10 according to the other embodiment.

FIG. 8 is a table for illustrating the operation of comparing battery information and the operation of selecting battery exchange targets in the surveillance system 10 according to the other embodiment.

Referring to FIG. 7, the gateway 200 extracts a network camera whose remaining battery charge level is zero based on battery information (S110). Referring to FIG. 8, the gateway 200 may extract a network camera 100a whose remaining battery life is zero as a first network camera.

Although not shown, the gateway 200 may receive event information respectively from network cameras 100a to 100f. For example, the gateway 200 may extract event detection times from the event information and store the event detection times in the memory 250 according to network camera identifiers. That is, each time the gateway 200 receives event information, the gateway 200 may update recent event detection times stored in the memory 250. In another example, the gateway 200 may store event detection frequencies of the network cameras 100a to 100f in the memory 250 according to the network camera identifiers CAMa to CAMf of the network cameras 100a to 100f. That is, each time the gateway 200 receives event information, the gateway 200 may increase event detection frequencies stored in the memory 250.

Referring back to FIG. 7, the gateway 200 extracts and compares recent event detection times of network cameras other than the network camera whose remaining battery charge level is zero (S1112). Referring again to FIG. 8, the gateway 200 may compare recent event detection times of the network cameras 100b to 100f.

Although not shown, the gateway 200 may extract and compare event detection frequencies of network cameras other than the network camera whose remaining battery charge level is zero.

Next, the gateway 200 extracts the network camera whose remaining battery charge level is zero (S1122), a network camera whose recent event detection time is the oldest (S1124), and selects, as a battery exchange target, one of the network camera whose remaining battery charge level is zero and the network camera whose recent event detection time is the oldest (S1132). Referring again to FIG. 8, the gateway 200 may select, as battery exchange targets, the network camera 100a whose remaining battery charge level is zero and the network camera 100e whose recent event detection time is the oldest. At this time, the gateway 200 may store remaining battery lives, which the network cameras 100a and 100e will have after the batteries of the network cameras 100a and 100e are exchanged, according to network camera identifiers CAMa and CAMe.

Although not shown, the gateway 200 may extract the network camera whose remaining battery charge level is zero and a network camera whose event detection frequency is the lowest, and may select the extracted network cameras as battery exchange targets.

In this manner, a manager may exchange the battery of a network camera that have not recently or frequently detect events with the battery of a network camera whose remaining battery charge level is zero, and thus the possibility that the surveillance system 10 fails to detect events may be reduced.

As described above, according to the one or more of the above embodiments, discharged batteries may be managed without incurring additional costs by exchanging batteries of network cameras according to the remaining charge levels of the batteries.

In addition, according to the one or more of the embodiments, a network camera which has not recently detected events or does not frequently detect events may be selected as a battery exchange target, and thus the possibility that the surveillance system 10 fails to detect events may be decreased.

That is, the surveillance system 10 may detect events more efficiently with low costs.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

The invention claimed is:

1. A surveillance system comprising:
a communication module receiving battery information from a plurality of network cameras; and
a processor calculating a plurality of remaining battery lives based on the battery information, wherein if a remaining battery life obtained from first battery information received from a first network camera is equal to or shorter than a preset reference remaining life, the processor selects a second network camera from among the plurality of network cameras so as to exchange a battery of the second network camera with a battery of the first network camera.

2. The surveillance system of claim 1, wherein the second network camera has a longest remaining battery life among the plurality of network cameras.

3. The surveillance system of claim 2, further comprising a memory storing a network camera identifier and an installation period of each of the plurality of network cameras,
wherein the processor extracts a network camera identifier and a remaining battery charge level of each of the plurality of network cameras from the battery information, calculates an average power consumption rate of each of the plurality of network cameras using the installation period and the remaining battery charge level based on the network camera identifier, and calculates the remaining battery life of each of the plurality of network cameras using the remaining battery charge level and the average power consumption rate of each of the plurality of network cameras.

4. The surveillance system of claim 1, wherein the communication module receives event information from the plurality of network cameras, and
the processor extracts a recent event detection time of each of the plurality of network cameras from the event information and selects a network camera whose recent event detection time is oldest as the second network camera.

5. The surveillance system of claim 1, wherein the communication module receives event information from the plurality of network cameras, and
the processor extracts an event detection frequency of each of the plurality of network cameras based on the event information and selects a network camera whose event detection frequency is lowest as the second network camera.

6. The surveillance system of claim 1, further comprising a network interface transmitting a battery-exchange alarm to a monitor terminal through a network, so as to request exchanging of the battery of the first network camera with the battery of the second network camera.

7. The surveillance system of claim 6, wherein the battery-exchange alarm comprises at least one of a first network camera identifier, a first remaining battery life, a second network camera identifier, a second remaining battery life obtained from second battery information received from the second network camera, and remaining battery lives that the first and second network cameras will have after the batteries of the first and second network cameras are exchanged.

8. The surveillance system of claim 1, further comprising a user interface receiving a user's input for setting the reference remaining life.

9. A method of controlling a surveillance system, the method comprising:
determining a reference remaining life;
receiving battery information from a plurality of network cameras;
calculating a plurality of remaining battery lives based on the battery information;
respectively comparing the plurality of remaining battery lives with the reference remaining life; and
if a first network camera having a first remaining battery life equal to or shorter than the reference remaining life is detected, selecting a second network camera from among the plurality of network cameras so as to exchange a battery of the second network camera with a battery of the first network camera.

10. The method of claim 9, wherein the selecting of the second network camera comprises selecting a network camera whose remaining battery life is longest among the plurality of network cameras as the second network camera.

11. The method of claim 10, wherein prior to the receiving of the battery information, the method further comprises storing a network camera identifier and an installation period of each of the plurality of network cameras,
wherein the calculating of the plurality of remaining battery lives comprises:
extracting a network camera identifier and a remaining battery charge level of each of the plurality of network cameras from the battery information;
calculating an average power consumption rate of each of the plurality of network cameras using the installation period and the remaining battery charge level based on the network camera identifier; and
calculating the plurality of remaining battery lives corresponding to the plurality of network cameras using the remaining battery charge level and the average power consumption rate of each of the plurality of network cameras.

12. The method of claim 9, wherein prior to the selecting of the second network camera, the method further comprises receiving event information from the plurality of network cameras,
wherein the selecting of the second network camera comprises:
extracting a recent event detection time of each of the plurality of network cameras from the event information; and
selecting a network camera whose recent event detection time is oldest as the second network camera.

13. The method of claim 9, wherein prior to the selecting of the second network camera, the method further comprises receiving event information from the plurality of network cameras,
wherein the selecting of the second network camera comprises:
extracting an event detection frequency of each of the plurality of network cameras based on the event information; and
selecting a network camera whose event detection frequency is lowest as the second network camera.

14. The method of claim 9, wherein after the selecting of the second network camera, the method further comprises:
generating a battery-exchange alarm to request exchanging of the batteries of the first and second network cameras; and
transmitting the battery-exchange alarm to a monitor terminal through a network.

15. The method of claim 14, wherein the battery-exchange alarm comprises at least one of a first network camera identifier, a second network camera identifier, and remaining battery lives that the first and second network cameras will have after the batteries of the first and second network cameras are exchanged.

* * * * *